UNITED STATES PATENT OFFICE.

WILLIAM EISENHAUER, OF NEW YORK, N. Y.

RUST-PREVENTING SOLUTION AND PROCESS OF PREPARING THE SAME.

1,344,338.  Specification of Letters Patent.  Patented June 22, 1920.

No Drawing.  Application filed June 14, 1919. Serial No. 304,302.

*To all whom it may concern:*

Be it known that I, WILLIAM EISENHAUER, a citizen of the United States, and a resident of New York, in the county of New York and State of New York, have invented new and useful Improvements in Rust-Preventing Solutions and Processes of Preparing the Same, of which the following is a specification.

This invention relates to the process of preparing a rust-preventing solution adapted to be used as a protective coating for metallic surfaces and the like to prevent rusting, corrosion or other deterioration thereof.

An important object of the invention is to provide a process for preparing a solution which may be easily and quickly applied to desired surfaces without injury to the clothing or person of one using the solution.

A further object of the invention is to provide a process for preparing a solution which will dry quickly when applied to any desired surface.

A further object of the invention is to provide a process for preparing a solution which will prevent deterioration of a surface regardless of whether the solution is applied prior to or subsequent to the application of paint.

A further object of the invention is to provide a solution which is cheap to manufacture, and highly satisfactory in use.

Certain objects and advantages of the solution prepared in accordance with the process will be apparent from the brief summary herebelow of certain characteristics of the solution, and the many instances in which the solution may be used to advantage, etc. Method of application, etc.:

The solution may be quickly and safely applied to any metal or other desired surface either by spraying, dipping, or by a coating brush. In fact it may be applied in any instance by any one of the well known methods used in applying paint and other coating material. One of the peculiar and very desirable characteristics of the solution is that it requires only a few seconds to dry when applied, leaving a dry clean surface free from grease or other undesirable foreign matter so commonly present in other solutions used for a similar purpose.

Another peculiar characteristic and desirable feature of the solution is that it is non-injurious to the human flesh or anything which it might by accident or otherwise come into contact with. Many, if not all of the previously proposed solutions for treating metallic surfaces, etc., have been found to have a caustic or other injurious effect on human flesh requiring the use of gloves or other means for protecting one's person.

Some of the special uses of the solution might be enumerated as follows:

It is well known that concrete contains more or less moisture when first placed or poured into forms and the like. Structural steel which is often used for reinforcing concrete structures and the like is therefore subject to a corrosive action when set or placed within the concrete. The solution when applied to the structural steel to be placed in such concrete has been found to resist any corrosive effect upon the steel due to the moisture within the concrete. The solution is particularly adapted also to be applied to ship bottoms to protect the ship from any deteriorating effect caused by the deteriorating action of the water thereupon regardless of whether the ship is constructed of wood or metal. The solution is recommended also for use upon any rigging or fixtures used upon the ship where such rigging or fixtures are subjected to the corrosive action of salt air thereupon. It might be well to mention that while it is desirable to apply the solution before painting, it, as a matter of fact, might be effectively used even after paint is applied to not only preserve the same but to prevent scaling thereof. The solution is further found to be highly valuable in protecting pipes used for carrying ammonia or ammonia gases as for example such as are employed or used in ice making or refrigerating plants. Steel troughs or the like used by meat packers and butchers in the pickling of meats are subjected to intense corrosive action of the heavy salt solutions used in the various pickling processes. The solution has been found to resist the corrosive action of the various salt solutions.

The solution is adapted to be used not only upon metallic surfaces of the larger areas as above referred to but is also adapted to be used upon small metallic articles such as locks and keys and all metal parts of automobiles and motor boats, etc.

The equipment necessary to the manufacture of the solution consists only of a metal kettle within which the several constituents are placed and boiled. Either a steam-heated kettle may be used or an ordinary kettle heated by any of the present known methods of heat generation such as the burning of coal, gas, oil, etc. The kettle employed should preferably have a capacity of about seventy-five gallons. The capacity of the kettle depends somewhat upon the conditions under which the solution would be manufactured but one containing about seventy-five gallons would seem to be the most feasible size. In the following description the quantities of the several constituents are given, however, to produce only five gallons of the solution. The several steps necessary to manufacture of the solution are as follows: First, pour into the kettle two and one-half gallons of ordinary commercial spirits of turpentine such as is used in ordinary paint. The turpentine is cold when poured into the kettle or rather is maintained at a temperature approximating the temperature of the surrounding atmosphere. After the turpentine has been deposited into the kettle the heat is turned on.

Immediately subsequent to the depositing of the turpentine into the kettle three pounds of gum thus is added. Gum thus is the gum of the Norway spruce and is supplied commercially in lumps looking very much like ordinary rosin but slightly lighter in color.

The turpentine is then brought to a boiling point and boiled to dissolve the gum thus, the gum thus being carried in solution within the turpentine. While the gum thus is being dissolved the contents of the kettle should be thoroughly stirred. The stirring need not be incessant but should be as much as is necessary to thoroughly mix the dissolved gum thus with the turpentine. The liquid carrying the gum thus in solution after boiling is of a milky or cloudy color.

The gum thus having been dissolved, to the solution already formed immediately add six pounds of vaseline. The solution is boiled until the vaseline is entirely dissolved into the solution, stirring actively as may be required, not incessantly but sufficiently to thoroughly mix the solution formed.

To the boiling solution of turpentine, gum thus, and vaseline one pint of preferably cheap floor varnish is added. No particular brand or kind of varnish is required but the brands ordinarily used have been either "Supreme" or "Schepolitan," which brands have been selected not because of any particular virtue but primarily because they are cheap.

Up to this time it has not been necessary to time the boiling of the liquid containing the several constituents or to stir it incessantly but at this particular point care and caution must be used and the next step must be carefully timed or watched, stirring the liquid incessantly and watching it carefully. At this point the solution is light brown in color. After a period of from three to five minutes it will be discovered that the solution starts to change to a darker shade. At the instant the solution begins to change from the light brown color to a darker shade the liquid is taken from over the heat or in other words the heat is discontinued. If the solution is allowed to boil after it begins to turn from a light brown to a darker shade it will rapidly turn black and its peculiar characteristics, namely, its corrosive resisting qualities, will be destroyed.

After the boiling is discontinued the solution is allowed to cool whereupon it becomes a completed commercial product ready to be supplied to the market in suitable containers such as cans or the like.

In reduction to practice, I have found that the various steps, necessary in the carrying of my process into effect, and referred to in the above description are the most effective, yet realizing that the conditions concurrent with the carrying of my process into use will necessarily vary, I desire to emphasize the fact that certain variations from the preciseness in the various steps which I have described may be executed, when necessary, without sacrificing any of the advantages of my invention as defined in the appended claims.

Having thus described my invention, what I claim as new and desire to secure and protect by United States Letters Patent, is:

1. A process for preparing a rust-preventing solution consisting in heating turpentine, dissolving gum thus in the turpentine, dissolving vaseline in the turpentine, and adding varnish to the solution containing the above named constituents.

2. A process for preparing a rust-preventing solution consisting in heating turpentine, dissolving gum thus in the turpentine, dissolving vaseline in the turpentine, adding varnish to the solution containing the above named constituents, and boiling the solution.

3. A process for preparing a rust-preventing solution consisting in heating turpentine, dissolving gum thus in the turpentine, dissolving vaseline in the turpentine, adding varnish to the solution containing the above named constituents, boiling the solution, and stirring the solution to thoroughly mix the constituents thereof.

4. A process for preparing a rust-preventing solution consisting in heating a quantity of turpentine, adding gum thus to the turpentine and boiling until it is dissolved, adding vaseline and boiling until it is dissolved and while boiling adding varnish.

5. A rust-preventing solution consisting of turpentine, gum thus, vaseline, and varnish.

WILLIAM EISENHAUER.